United States Patent
Xu et al.

(10) Patent No.: US 11,177,770 B2
(45) Date of Patent: Nov. 16, 2021

(54) CONTROLLABLE SYSTEM FOR SHUTTING DOWN CONNECTION BETWEEN PHOTOVOLTAIC PANELS

(71) Applicant: CHANGSHU FRIENDS CONNECTOR TECHNOLOGY CO., LTD., Suzhou (CN)

(72) Inventors: Jianming Xu, Suzhou (CN); Zhongming Xia, Suzhou (CN)

(73) Assignee: CHANGSHU FRIENDS CONNECTOR TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 16/831,836

(22) Filed: Mar. 27, 2020

(65) Prior Publication Data

US 2020/0395889 A1 Dec. 17, 2020

Related U.S. Application Data

(63) Continuation of application No. PCT/CN2019/118234, filed on Nov. 14, 2019.

(30) Foreign Application Priority Data

Jun. 14, 2019 (CN) .......................... 201910513929.7

(51) Int. Cl.
*H02S 40/36* (2014.01)
*H02H 7/20* (2006.01)

(52) U.S. Cl.
CPC .............. *H02S 40/36* (2014.12); *H02H 7/20* (2013.01)

(58) Field of Classification Search
CPC .......... H02S 40/36; H02S 40/34; H02S 40/32; H02S 40/30; H02H 7/20; H02H 7/18;
(Continued)

(56) References Cited

U.S. PATENT DOCUMENTS 10,038,317 B1* 7/2018 McCracken ...... H01L 31/02021
2013/0313909 A1* 11/2013 Storbeck ................. H02M 3/04
307/77

(Continued)

FOREIGN PATENT DOCUMENTS

CN 1578123 A 2/2005
CN 103427406 A 12/2013
(Continued)

*Primary Examiner* — Rexford N Barnie
*Assistant Examiner* — Jagdeep S Dhillon
(74) *Attorney, Agent, or Firm* — Bayramoglu Law Offices LLC

(57) ABSTRACT

A controllable system for shutting down the connection between photovoltaic panels is provided. A connector with the function described in the present invention is arranged on a current transmission line between two photovoltaic panels adjacent to each other. A signal processing system, a power supply system, a control circuit, and an electronic switch element are arranged in the connector. The signal generator inputs a signal into the current transmission line, and the signal processing system separates the signal. A part of the signal continues to be transmitted along the current transmission line to other connectors on the current transmission line, and the other part of the signal is divided into a control signal and a power supply signal. The control signal passes through the control circuit and controls the electronic switch element to be turned on or off.

6 Claims, 1 Drawing Sheet

(58) Field of Classification Search
CPC . H02H 7/35; H02H 1/0015; H02J 3/38; H02J 3/381; H02J 3/385; H02J 3/383; H02J 3/386; H02J 13/0003; H02J 13/0004; H01L 31/02021; Y02E 10/56; Y02E 10/50; Y02E 40/70
USPC .................. 307/78, 80, 82, 77, 85, 87, 66
See application file for complete search history.

(56) References Cited

U.S. PATENT DOCUMENTS

| | | | | |
|---|---|---|---|---|
| 2015/0061409 A1* | 3/2015 | Dunton | ............... | H03K 17/7955 307/115 |
| 2016/0036235 A1* | 2/2016 | Getsla | ................... | H02J 3/383 307/80 |
| 2016/0099573 A1* | 4/2016 | Hopf | ..................... | H02J 3/383 307/52 |
| 2016/0164457 A1* | 6/2016 | Robbins | ................... | H02J 3/46 307/80 |
| 2016/0172863 A1* | 6/2016 | Robbins | ................. | H02J 3/381 323/234 |
| 2016/0190798 A1* | 6/2016 | Narla | ..................... | H02J 3/381 307/80 |
| 2019/0085476 A1* | 3/2019 | Koeneman | ............. | C25B 11/02 |
| 2019/0363200 A1* | 11/2019 | Hoft | ........................ | H02S 40/36 |

FOREIGN PATENT DOCUMENTS

| | | | | |
|---|---|---|---|---|
| CN | 206349979 U | 7/2017 | | |
| CN | 207150526 U | 3/2018 | | |
| CN | 107967021 A | 4/2018 | | |
| CN | 109245713 A | 1/2019 | | |
| CN | 109818567 A | 5/2019 | | |
| CN | 110311625 A | 10/2019 | | |
| WO | WO-2010078303 A2 * | 7/2010 | .......... | H02J 13/0003 |
| WO | WO-2017214714 A1 * | 12/2017 | ............ | H02S 40/36 |
| WO | 2018046653 A1 | 3/2018 | | |

* cited by examiner

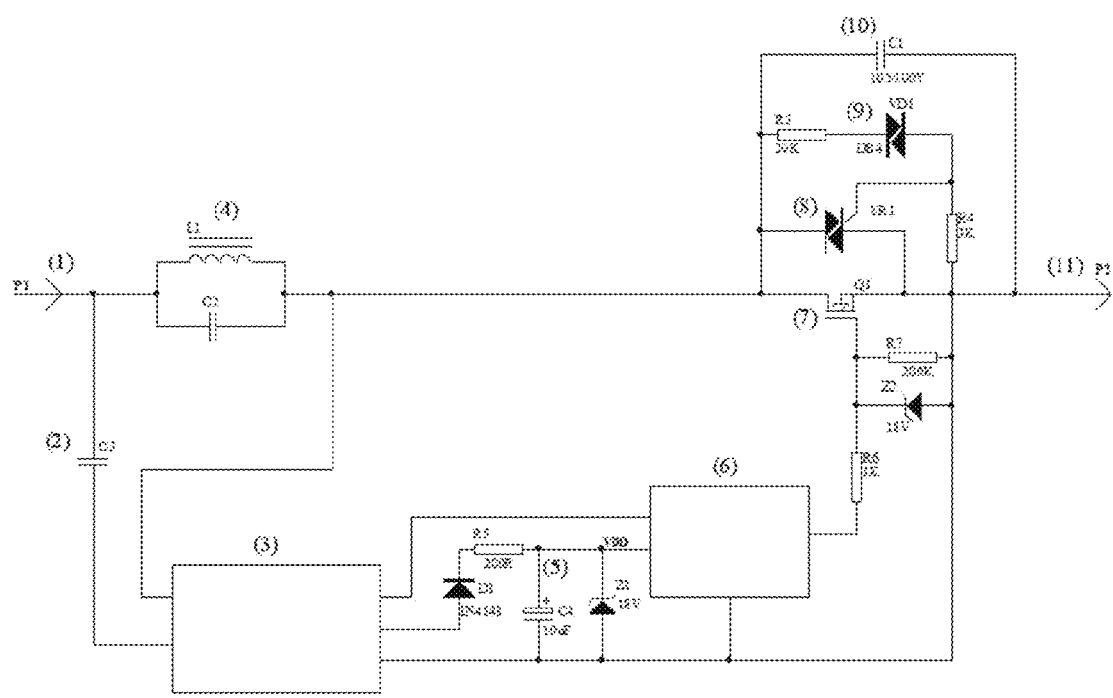

CONTROLLABLE SYSTEM FOR SHUTTING DOWN CONNECTION BETWEEN PHOTOVOLTAIC PANELS

CROSS REFERENCE TO THE RELATED APPLICATIONS

This application is the continuation application of International Application No. PCT/CN2019/118234, filed on Nov. 14, 2019, which is based upon and claims priority to Chinese Patent Application No. 201910513929.7, filed on Jun. 14, 2019, the entire contents of which are incorporated herein by reference.

TECHNICAL FIELD

The present disclosure relates to the technical field of photovoltaic power supplies.

BACKGROUND

The International Electrotechnical Commission recently distributed a new photovoltaic grid safety standard in the *National Electrical Code* (NEC) in 2017, The newly issued photovoltaic grid safety standard is issued by the International Electrotechnical Commission, and implemented in North America. Item number 690.12, of the safety standard stipulates that after the bus breaker at the input end of a photovoltaic array inverter is disconnected, the connection between the photovoltaic arrays at the front end must also be automatically shut down, so that the voltage to a ground of any node of the photovoltaic array will not exceed 80V. In order to carry out this functionality, manufacturers have designed a variety of photovoltaic modules or accessories in this area. Most of the junction box solutions used are capable of being shut down. Although junction boxes with shut off functionality are relatively easy to design and convenient to practice, many of the designs are unwieldy for users. The junction boxes with the shutdown functionality are inconvenient for users when testing the power and quality of the finished product. Moreover, in use, if the junction box fails and does not shut down, the whole panel will have to be replaced. Currently, there is no suitable technology, or special tools, to prevent failure of the junction box.

In order to solve the above technical problems, a connector capable of being shut down has been developed. The connector has four connecting plugs, wherein two connecting plugs are two photovoltaic current line plugs, and the other two connecting plugs are (1) an auxiliary communication plug and (2) a function line plug. When in operation, a connector with shutdown capability is not only complicated and troublesome to install, but a person installing the connector also needs to lay an auxiliary cable roughly the same length as the array circuit. Therefore such connectors are likely to be unpopular.

SUMMARY

The technical problem solved by the present invention is to realize the synchronous turn-on/off of all connectors based on only one current transmission line of the photovoltaic array, without the need for an auxiliary line.

In order to solve the above technical problem, the present invention provides the following technical solution. A controllable system for shutting down a connection between photovoltaic panels is provided, wherein a plurality of photovoltaic panels are connected in a series through a current transmission line, and a connector is arranged on the current transmission line between each two photovoltaic panels adjacent to each other. A signal processing system, a power supply system, a control circuit and an electronic switch element are arranged in the connector. A signal generator inputs a signal into the current transmission line, and the signal processing system separates the signal. A part of the signal continues to be transmitted along the current transmission line to other connectors on the current transmission line, and the other part of the signal is divided into a control signal and a power supply signal. The control signal passes through the control circuit and controls the electronic switch element to be turned on or off. The power supply signal is then transmitted to the power supply system and used as a power source of the control circuit. The electronic switch element is arranged on the current transmission line.

In the controllable system of the present invention, the connector has only one positive connection plug and one negative connection plug. These plugs are directly inserted between two conventional photovoltaic panels to achieve the controlled shutdown function.

In the controllable system of the present invention, the switch action execution signal of the connector adopts the closed-loop single-bus communication mode. In the communication mode, the signal only operates in a one array loop. Even if the inverter load is shared with other arrays, the signal will not jump into the next array and cause control interference.

The signal processing system allows a large DC current to pass through and a low-resistance electronic switch element is provided inside the connector, so that the connector can achieve an ultra-low power consumption of no more than 0.3 W in the turned-on state.

A set of signal frequency selections and vibration boost circuits are provided inside the connector to form a power supply system that is used as the working power supply for the internal electronic circuit, thus realizing an existing power supply working environment without external power supply.

The connector, according to this system, is not only convenient for installation, debugging, maintenance and replacement, also has greater advantages over the junction box in the prior art in terms of the sales price.

BRIEF DESCRIPTION OF DRAWING

The present invention is further described in conjunction with the drawings.

FIGURE is an internal circuit diagram of the connector according to the controllable system of the present invention.

In the drawing:
1. connector negative electrode, 2. DC blocking capacitor, 3. signal detection and enhancement circuit, 4. LC resonant module, 5. energy storage capacitor, 6. switch control circuit, 7. electronic switch element, 8. bidirectional thyristor, 9. overvoltage trigger conduction element, 10. high frequency signal bypass capacitor, 11. connector positive electrode.

DETAILED DESCRIPTION OF EMBODIMENT

A controllable system for shutting down a connection between photovoltaic panels is provided. A plurality of photovoltaic panels are connected in series through a current transmission line, and a connector is arranged on the current transmission line between each two photovoltaic panels adjacent to each other.

As shown in FIGURE, the signal processing system, the power supply system, the control circuit and the electronic switch element are arranged in the connector. The signal generator inputs a signal into the current transmission line, and the signal processing system separates the signal. A part of the signal continues to be transmitted along the current transmission line to other connectors on the current transmission line, and the other part of the signal is divided into a control signal and a power supply signal. The control signal passes through the control circuit and controls the electronic switch element to be turned on or off. Then the power supply signal is transmitted to the power supply system as the power source of the control circuit. The electronic switch element is arranged on the current transmission line.

The signal processing system includes the LC resonant module 4, the DC blocking capacitor 2, and the signal detection and enhancement circuit 3. The LC resonant module is arranged on the current transmission line, and the DC blocking capacitor is connected in series to the signal detection and enhancement circuit, and then connected in parallel to the resonant module. The signal detection and enhancement circuit is connected respectively to the switch control circuit 6 and the power supply system. Specifically, the signal detection and enhancement circuit is a combination of the signal detection circuit and the signal enhancement circuit in the prior art, wherein the signal detection circuit is the signal screening circuit, and the signal enhancement circuit is the signal amplification circuit. The signal detection and enhancement circuit is the amplification circuit with the signal detection function that is disclosed in Chinese patent application No. CN1578123A. The DC blocking capacitor can block the direct current. The switch control circuit is a new type of MOS tube switch control circuit that is disclosed in Chinese patent application No. CN206349979U, or an MOS tube driving voltage control circuit that is disclosed in Chinese patent application No. CN107967021A.

The power supply system includes the diode and the energy storage capacitor 5. The diode and the energy storage capacitor 5 are connected to the signal detection and enhancement circuit. The diode rectifies and stabilizes a signal from the signal detection and enhancement circuit 3, and the signal through the diode is stored in the energy storage capacitor to ensure the function of the later control circuit.

As an option, the electronic switch element 7 is an MOS tube, that is, an MOS type power switch tube. The grid electrode of the MOS tube is connected to the switch control circuit 6.

The connector is provided with a high frequency signal bypass circuit connected in parallel to the electronic switch element 7. The high frequency signal bypass circuit is connected in parallel to the MOS tube, and the high frequency signal bypass circuit is provided with the capacitor 10 and used as the bypass channel for the signal when the MOS tube is not turned on.

The connector is provided with an overvoltage protection circuit connected in parallel to the electronic switch element 7. Specifically, the bidirectional thyristor 8 with high withstanding voltage, and high current is connected in parallel between the drain electrode and the source electrode of the MOS tube. As a preferred improvement, the over voltage automatic trigger conduction element 9, such as a bidirectional trigger diode, is further provided between the drain electrode and the source electrode of the MOS tube, thereby protecting the MOS tube from breakdown during the shutdown process.

In practice, a plurality of photovoltaic panels forms a photovoltaic array through a current transmission line, and a connector is arranged on the current transmission line between each two adjacent photovoltaic panels. When the connector between the photovoltaic panels needs to shut down, the signal generator connected to the current transmission line transmits a signal to the current transmission line. The signal enters from the negative pole 1 of the connector and flows into the LC resonant module 4. When the signal passes through the LC resonant module, since the LC resonant module blocks the high frequency signal, part of the signal is filtered and then enters into the signal detection and enhancement circuit 3 through the DC blocking capacitor 2. After a signal is screened and enhanced by the signal detection and enhancement circuit, one part of the signal is sent to the switch control circuit 6 at a later stage. The other part of the signal is rectified and stabilized, and then stored in the energy storage capacitor 5 to supply electrical power to the control circuit. After receiving the conduction command, the control circuit outputs the conduction voltage to the grid electrode of the MOS tube to turn on the electronic switch element 7. When all the connectors of the photovoltaic array are turned on, the photovoltaic array can supply electrical power to the external load. In contrary, for example, if the control circuit receives a shutdown command or does not receive any conduction command at all, the MOS tube is shut down, and the current transmission line of the photovoltaic array is disconnected. When dangerous overvoltage occurs at both ends of the electronic switch element 7 during the shutdown process, the thyristor (bidirectional thyristor 8) can conduct in real time and bypass the overvoltage. When the circuit of the array is completely turned off, the thyristor automatically returns to the shutdown state due to lack of sustainable current.

The present invention overcomes several technical problems in design as follows:

First, in case of no auxiliary line, where can the power supply for the electronic elements inside the connector capable of being shut down come from? Is the power supply possible to achieve to the control function required by the electronic switch element?

Second, in the case of no auxiliary line and relying on one current transmission line of a photovoltaic array, how is the communication signal controlled by the switch transmit? How is the minimum voltage drop in the DC current ensured while the control signal is extracted from a wire?

Third, because the electronic switch elements inside each connector are not completely consistent during the shutdown time, the connectors that first shutdown will withstand a high cut-off voltage, which will cause the electronic switch element to break down. The over-voltage automatic protection function of the electronic switching element of this, is a considerable improvement in the design course of such a connector that is capable of being shut down.

In the present invention, the communication technology of a single loop bus is employed. Since this kind of communication only operates in a one array loop, even if the inverter load is shared with other arrays, the signal will not jump into the next array.

Combined with the drawings and the prior art, the technical solution described in the present invention can be achieved by the above description. The signal generator can be controlled separately, and send different switch control signals to control the electronic switch element to be either turned on or off. In one respect of the present invention, a main control module responsible for managing intelligently all connectors capable of being shut down and sending switch control command signals, is installed in a photovoltaic array circuit with connectors capable of being shut down. This module can automatically detect whether the array circuit is a closed-loop or open circuit, the existence of AC network voltage, and can also realize local panel manual intervention control or remote communication control.

The above content is only the preferred embodiment of the present invention. Those skilled in the art can change the specific implementation mode and application scope according to the ideas of the invention, and the contents of this specification should not be construed as restrictions on the present invention.

What is claimed is:

1. A controllable system for shutting down a connection between photovoltaic panels, wherein, a plurality of photovoltaic panels are connected in a series through a current transmission line, and a connector is arranged on the current transmission line between two photovoltaic panels adjacent to each other;
  - a signal processing system, a power supply system, a control circuit and an electronic switch element are arranged in the connector;
  - a signal generator inputs a signal into the current transmission line, and the signal processing system separates the signal into a first part of the signal and a second part of the signal;
  - the first part of the signal continues to be transmitted along the current transmission line to other connectors on the current transmission line, and the second part of the signal is divided into a control signal and a power supply signal;
  - the control signal passes through the control circuit and controls the electronic switch element to be turned on or off, and the power supply signal is transmitted to the power supply system as a power source of the control circuit; and
  - the electronic switch element is arranged on the current transmission line, wherein
  - the signal processing system includes an LC resonant module, a DC blocking capacitor, and a signal detection and enhancement circuit;
  - the LC resonant module is arranged on the current transmission line, and the DC blocking capacitor is connected in series to the signal detection and enhancement circuit, and connected in parallel to the LC resonant module; and
  - the signal detection and enhancement circuit is respectively connected to the control circuit and the power supply system.

2. The controllable system according to claim 1, wherein the connector is provided with a high frequency signal bypass circuit connected in parallel to the electronic switch element.

3. The controllable system according to claim 1, wherein the connector is provided with an overvoltage protection circuit connected in parallel to the electronic switch element.

4. The controllable system according to claim 1, wherein a signal communication manner of the connector is a closed-loop single-bus communication manner of loading a communication signal onto the current transmission line.

5. The controllable system according to claim 1, wherein the electronic switch element is a MOS tube.

6. The controllable system according to claim 1, wherein an external structure of the connector is provided with one positive plug and one negative plug.

* * * * *